United States Patent
Lee (10) Patent No.: US 7,936,824 B2
(45) Date of Patent: May 3, 2011

(54) METHOD FOR CODING AND DECODING MOVING PICTURE

(75) Inventor: Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1560 days.

(21) Appl. No.: 11/260,032

(22) Filed: Oct. 25, 2005

(65) Prior Publication Data

US 2006/0088224 A1 Apr. 27, 2006

(30) Foreign Application Priority Data

Oct. 27, 2004 (KR) .................. 10-2004-0086318

(51) Int. Cl.
*H04N 11/02* (2006.01)
(52) U.S. Cl. .................. 375/240.19; 375/240.23
(58) Field of Classification Search .......... 375/240.19, 375/240.23; 382/166, 232, 236, 238, 239, 382/245, 248, 251
See application file for complete search history.

(56) References Cited

U.S. PATENT DOCUMENTS

| | | | | |
|---|---|---|---|---|
| 6,393,054 B1 * | 5/2002 | Altunbasak et al. | ........... | 375/240 |
| 6,587,058 B1 * | 7/2003 | Deeley et al. | .................. | 341/67 |
| 6,731,684 B1 * | 5/2004 | Wu | ........................... | 375/240.12 |
| 6,983,015 B1 * | 1/2006 | Saunders et al. | ........... | 375/240.1 |
| 7,720,145 B2 * | 5/2010 | Muthukrishnan et al. | ........................ | 375/240.03 |
| 2002/0006164 A1 * | 1/2002 | Felts | ........................ | 375/240.19 |
| 2002/0009233 A1 * | 1/2002 | Pesquet-Popescu | .......... | 382/240 |
| 2002/0101922 A1 | 8/2002 | Pesquet-Popescu | | |
| 2004/0062313 A1 * | 4/2004 | Schoenblum | ........... | 375/240.25 |
| 2005/0123208 A1 * | 6/2005 | Sheraizin et al. | ............. | 382/239 |
| 2005/0195896 A1 * | 9/2005 | Huang et al. | ............. | 375/240.03 |

OTHER PUBLICATIONS

Balster, E.J.; Zheng, Y.F.; "Constant quality rate control for content-based 3D wavelet video communication", Intelligent Control and Automation, 2002.
Proceedings of the 4th World Congress on vol. 3, Jun. 10-14, 2002 pp. 2056-2060.
Balster, E.J.; Zheng, Y.F.; "Real-time video rate control algorithm for a wavelet-based compression scheme" Circuits and Systems, 2001. MWSCAS 2001, Proceedings of the 44th IEEE 2001 Midwest Symposium on vol. 1, Aug. 14-17, 2001 pp. 492-496.
Balster, E.J., et al.; "Constant quality rate control for content-based 3D wavelet video communication"; Proceedings of the 4th World Congress on Intelligent Control and Automation; vol. 3; Jun. 10, 2002; pp. 2056-2060.
Balster, E.J., et al.; "Real-time video rate control algorithm for a wavelet-based compression scheme"; Proceedings of the 44th IEEE 2001 Midwest Symposium on Circuits and Systems (MWSCAS 2001); vol. 1, Aug. 14, 2001; pp. 492-496.

* cited by examiner

*Primary Examiner* — Gregory F Cunningham
(74) *Attorney, Agent, or Firm* — Lee, Hong, Degerman, Kang & Waimey (57) ABSTRACT

Provided is a method of coding and decoding a moving image, which can optimize the coding rate and reduce the time required for decoding the first image frame during an operation of displaying the image. The coding method includes receiving an image, determining the number of frames in a GOP to be decoded with respect to the image, performing a 3D wavelet transformation on the GOP, and coding the results of the 3D wavelet transformation.

17 Claims, 6 Drawing Sheets

| LLL, LLL | LLL, LLH | LL, LH | L, H |
| LLH, LLL | LLH, LLH | | |
| LH, LL | LH, LH | | |
| H, L | | | H, H |

METHOD FOR CODING AND DECODING MOVING PICTURE

CROSS REFERENCE TO RELATED APPLICATIONS

Pursuant to 35 U.S.C. §119(a), this application claims the benefit of earlier filing date and right of priority to Korean Patent Application No. 10-2004-0086318, filed on Oct. 27, 2004, the content of which is hereby incorporated by reference herein in its entirety.

BACKGROUND OF THE INVENTION

1. Field of the Invention

This document relates to a method for coding and decoding a moving picture.

2. Description of the Related Art

A scheme of compressing (coding) a moving image has been advanced from MPEG1, 2, 4 to H.264 (MPEG4 part 10, AVC). After MPEG2 was developed for compression of a high-quality moving image in a digital television (DTV), MPEG4 was developed to enable objects to be respectively compressed on the basis of H.263 that is dedicated mainly for communication purposes. MPEG4 is so excellent that it is adopted as the standard in almost all fields of mobile technology.

Meanwhile, H.264 requires about 5-50 times the calculation of MPEG4 while providing a higher coding rate than MPEG4. Accordingly, H.264 is used for digital mobile broadcasting (DMB) by employing only a decoder having a relatively small amount of calculation.

Recently, researches are actively conducted to develop new image codec algorithms capable of providing a high coding rate with a relatively small amount of calculation.

An example of the new image codec algorithms is a moving image codec using a wavelet transform scheme.

In comparison with the existing MPEG using a discrete cosine transform (DCT) scheme, the wavelet transform type image coding scheme can provide an excellent scalability and image quality. Therefore, the wavelet transform type image coding scheme is considered as the next generation image codec.

The wavelet transform type moving image codec basically performs a wavelet transformation on one frame and then encodes the resulting value.

However, the wavelet transformation scheme does not perform a coding operation on the time axis and thus has a lower coding rate than MPEG4. To overcome this drawback, there is proposed a three-dimensional (3D) wavelet coding scheme for performing a wavelet transformation on a group of frames for the time axis.

However, since a group of frames are simultaneously coded for a wavelet transformation, one frame can be decoded only when the entire frame group is decoded. That is, the entire frame group must be decoded so as to decode only one frame, and the first frame of the frame group can be displayed only after the entire frame group is decoded. Therefore, it takes a long time to display the first frame by the 3D wavelet transformation.

In this manner, the coding rate and the display time for the first frame varies depending on how many frames are included in the frame group in the moving image codec using the 3D wavelet transformation.

When many frames are included in the frame group for a high coding rate, it takes a long time to display the first frame. On the contrary, when a few frames are included in the frame group, the coding rate is undesirably reduced.

SUMMARY OF THE INVENTION

Accordingly, the present invention is directed to a method for coding and decoding a moving image that substantially obviates one or more problems due to limitations and disadvantages of the related art.

An object of the present invention is to provide a method for coding and decoding a moving image, which can optimize the coding rate and reduce the time required for decoding the first image frame during an operation of displaying the image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of coding a moving image, including: receiving an image; determining the number of frames in a GOP to be decoded with respect to the image; performing a 3D wavelet transformation on the GOP; and coding the results of the 3D wavelet transformation.

In another aspect of the present invention, there is provided a method of decoding an image, including: receiving a coded image; performing a VLD operation on the coded image; performing an inverse quantization operation on the result of the VLD operation by a quantization parameter to extract data about the number of frames in a GOP; and performing a 3D wavelet transformation on the inverse quantization result with reference to the number of the frames.

In a further another aspect of the present invention, there is provided an apparatus for decoding an image, including: a VLD unit for performing a VLD operation on an inputted image; a frame number extractor for performing an inverse quantization operation on the result of the VLD operation to extract data about the number of frames in a GOP; and a wavelet transformer for performing a wavelet transformation on the result of the inverse quantization.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention proposes a method of reducing a decoding time delay while maximizing a coding rate in performing a 3D wavelet transformation.

As known in the art, the 3D wavelet transformation functions to represent the frequency characteristic of an image in terms of numerical value. When an image is processed by a wavelet filter described below, it is divided into a component of a high frequency region and a component of a low frequency region.

Analysis Low-pass filter: $-1/8, 1/4, 3/4, 1/4, -1/8$
Analysis High-pass filter: $-1/2, 1, -1/2$
Synthesis Low-pass filter: $1/2, 1, 1/2$
Synthesis High-pass filter: $-1/8, -1/4 3/4, -1/4, -1/8$ When an analysis high frequency filter is applied in a horizontal direction, a frequency component of the image has a large value in a region where a vertical edge is large. When the analysis high frequency filter is applied in a vertical direction, the frequency component of the image has a large value in a region where a horizontal edge is large. On the contrary, when a low frequency filter is applied, the frequency component has large values in a region where no edge exists.

Figure 1:
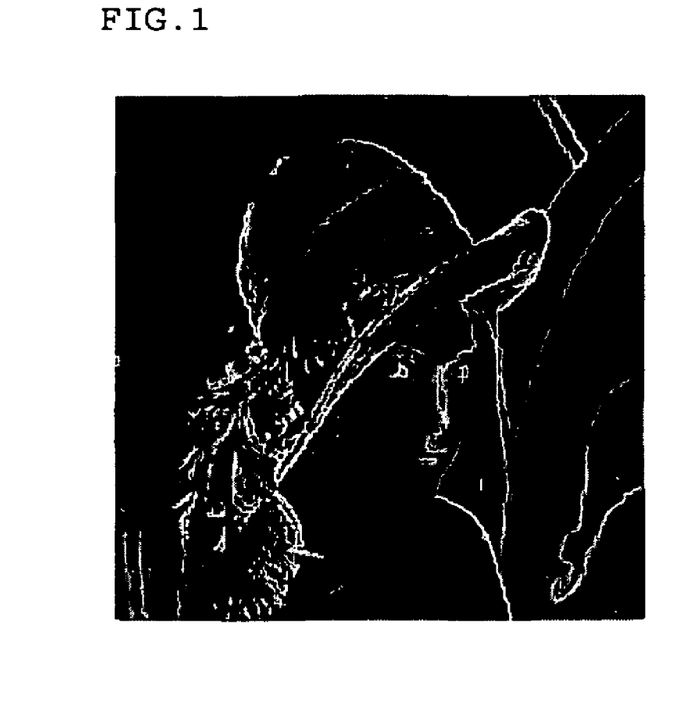
FIGS. 1 to 3 are diagrams illustrating a wavelet transformation.
Figure 2:
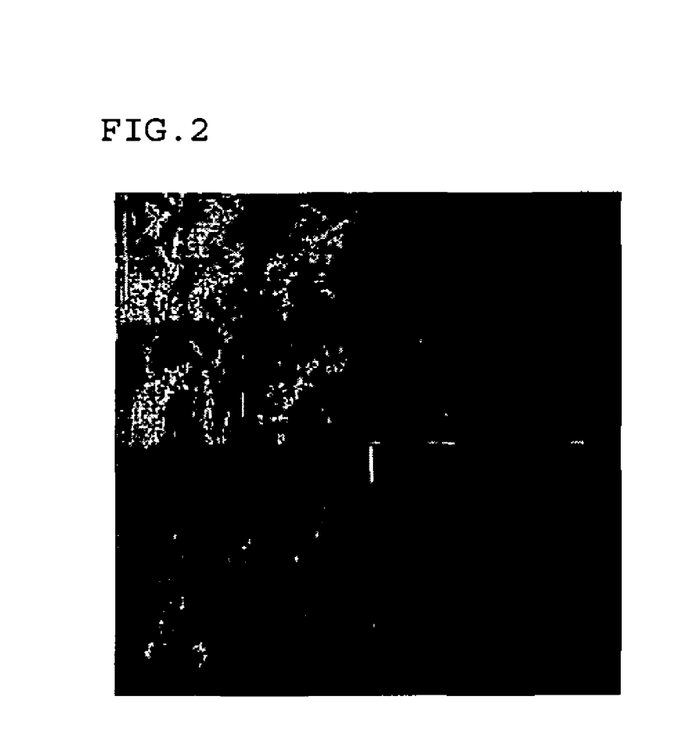
Figure 3:
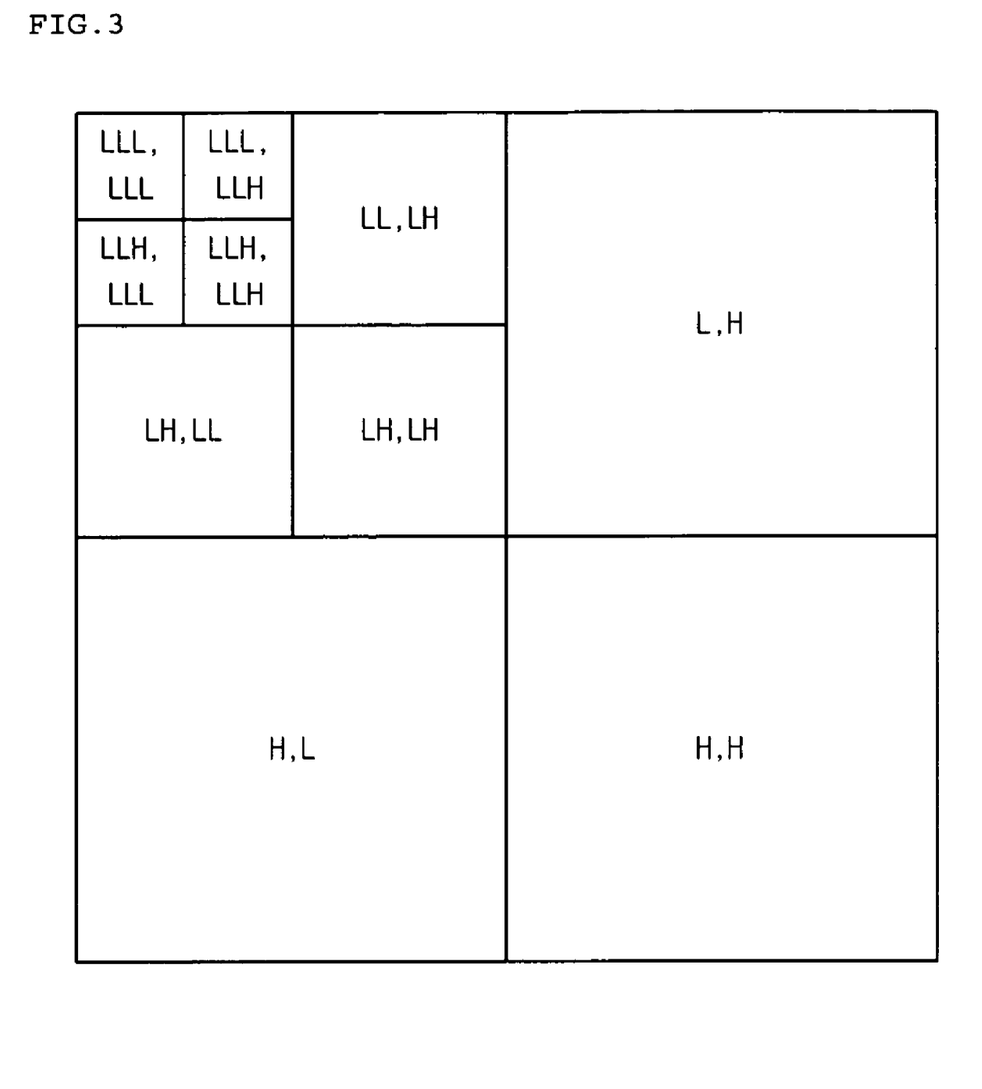

FIGS. 1 to 3 are diagrams illustrating a wavelet transformation.

Specifically, FIG. 1 illustrates an original image, and FIG. 2 illustrates a wavelet transformation result of the original image. In FIG. 2, a bright portion of a region HH means a portion where an edge is large, and a region LL is represented in the form of reduced original image. FIG. 3 illustrates the mean of the meaning of the wavelet-transformed image in FIG. 2.

Referring to FIG. 3, "HH" represents a case where a high frequency filter is applied in the horizontal and vertical directions. "HL" represents a case where a high frequency filter and a low frequency are applied in the horizontal direction and the vertical direction, respectively. "LH" represents a case where a low frequency filter and a high frequency are applied in the horizontal direction and the vertical direction, respectively. "LL" represents a case where a low frequency filter is applied in the horizontal and vertical directions.

The reason for this is that because small values near zero occur intensively in most of the high frequency region and large values occur intensively in the region LL, data can be highly compressed when an encoding operation is performed on the small-value portion.

A 3D wavelet transformation means that the wavelet transformation is performed on a moving image also for the time axis.

Figure 4:
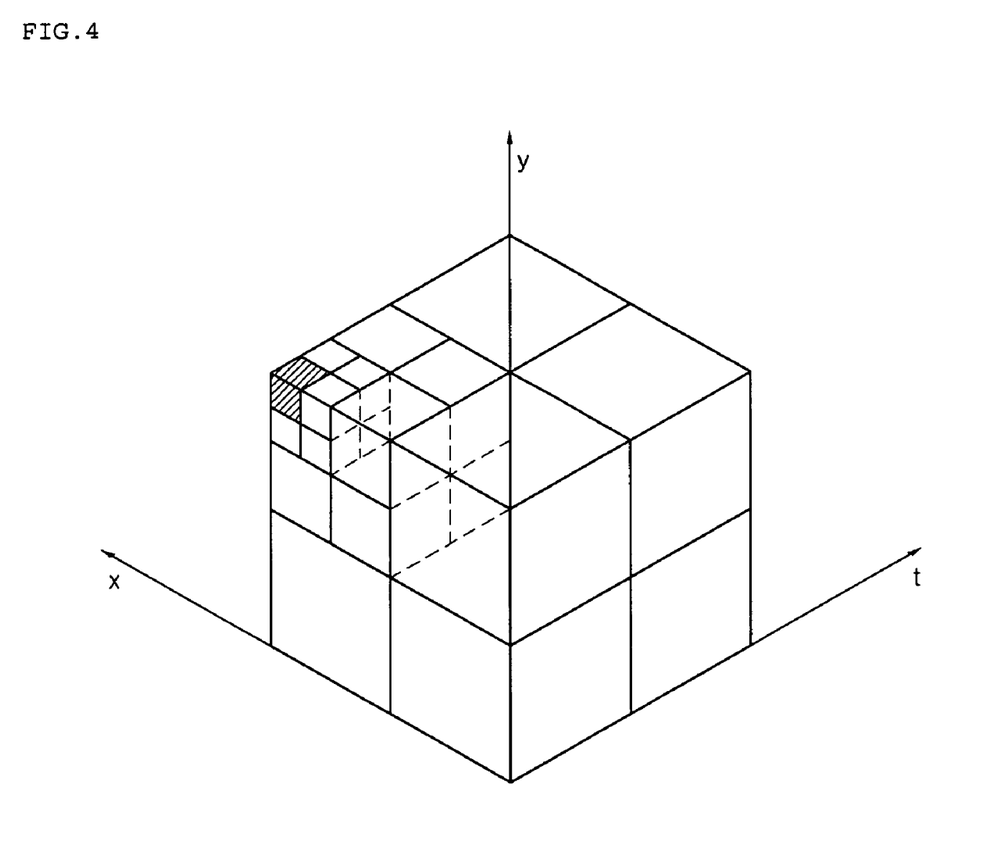
FIG. 4 is a diagram illustrating a 3D wavelet transformation.

FIG. 4 is a diagram illustrating a 3D wavelet transformation.

Referring to FIG. 4, a GOP is constituted by an n number of frames so as to perform the wavelet transformation for the time (t) axis. When the length of a GOP (i.e., the number of the frames) is too small, compression on the time axis decreases to reduce the coding rate. On the contrary, when the length of the GOP is too large, a long time is required for decoding the first image frame because the entire GOP must be decoded so as to restore only one frame of the GOP.

Figure 5:
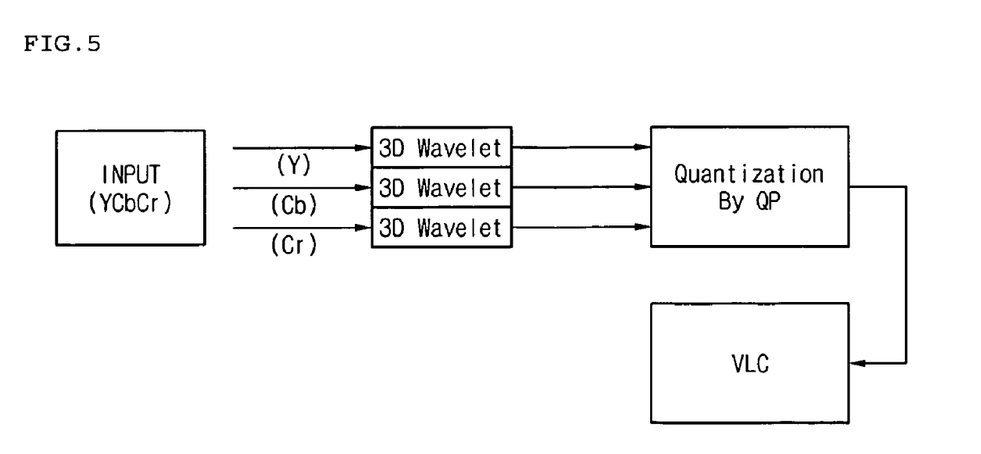
FIG. 5 is a diagram illustrating a method of coding a moving image on the basis of a 3D wavelet transformation.

FIG. 5 is a diagram illustrating a method of coding a moving image on the basis of the 3D wavelet transformation.

Referring to FIG. 5, when an original image represented in a YCbCr color space is inputted, a 3D wavelet transformation is performed on each of a Y-component frame, a Cb-component frame and a Cr-component frame.

The results of the wavelet transformation each are divided by a quantization parameter (QP), and the resulting quotients are compressed in each frequency region by a variable length coding (VLC) technique of the existing MPEG4. Like the existing MPEG 1, 2 and 4, when the QP is increased, the coding rate is increased but the image quality is degraded. On the contrary, when the QP is reduced, the image quality is upgraded but the coding rate is reduced.

Figure 6:
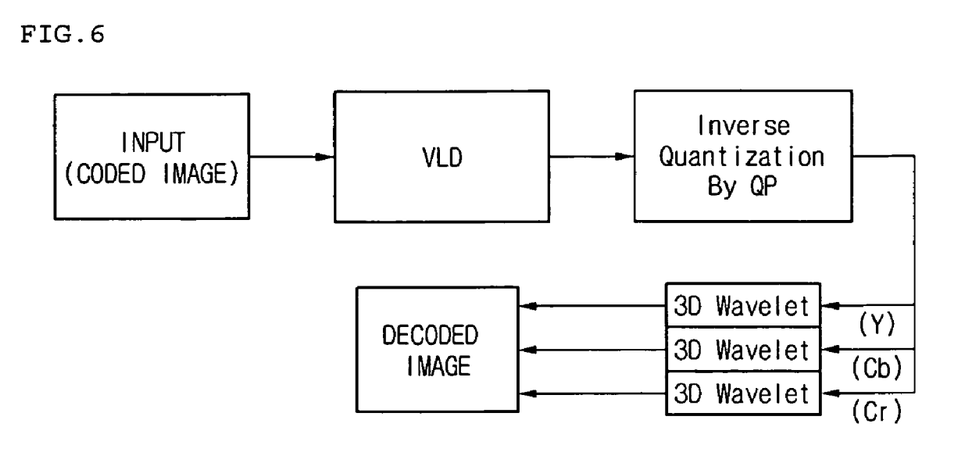
FIG. 6 is a diagram illustrating a method of decoding a coded moving image on the basis of a 3D wavelet transformation.

FIG. 6 is a diagram illustrating a method of decoding a coded moving image on the basis of a 3D wavelet transformation.

The decoding method is performed in the reverse order of the coding method illustrated in FIG. 5.

Referring to FIG. 6, a variable length decoding (VLD) operation, an inverse quantization, and a 3D wavelet transformation using coefficients of the synthesis wavelet filter are sequentially performed on a coded image, thereby restoring an original color image.

At this time, in order to completely decode one frame, a wavelet transformation must be performed on frames in one GOP on the time axis and then a wavelet transformation must be performed on each of the frames. Therefore, the decoding time varies according to the number of the frames in the GOP.

In general, a decoding operation is efficiently performed on the time axis when a small difference exists between consecutive image frames. When a large difference exists between the consecutive image frames, the coding efficiency is degraded because large values occur also in the high frequency region in spite of the time-axis compression.

Accordingly, because the compressed image still has a large size, a longer time is required for the VLD operation even with respect to GOPs with the same size.

For an efficient coding operation on the basis of the above-mentioned principle, the embodiment of the present invention proposes a method of coding a moving image by grouping a relatively large number of frames only when a coding rate is efficient. In the above method, the number of frames in a GOP is increased when a difference between consecutive images is small, and the number is reduced when the difference is large. In this case, even when the number of frames in a GOP is large, because the size of a coded image is small due to the coding efficiency, the time required for performing a VLD operation is reduced to reduce the time required for decoding one frame.

Also, in the moving image coding method according to the embodiment, a wavelet transformation is performed using a difference from a previous frame when it is performed with respect to the time axis. Generally, there is a high probability that each of consecutive frames has a small difference from a corresponding previous frame. Accordingly, when a wavelet transformation is performed using the difference from the previous, more small values appear in a high frequency region and thus the coding rate can be more improved than when a wavelet transformation is directly performed with respect to the time axis. Moreover, the sum of these difference values can be used in determining the number of frames in a GOP.

A moving image coding method using the 3D wavelet transformation that well reflects the abovementioned features will now be described with reference to FIG. 7.

Figure 7:
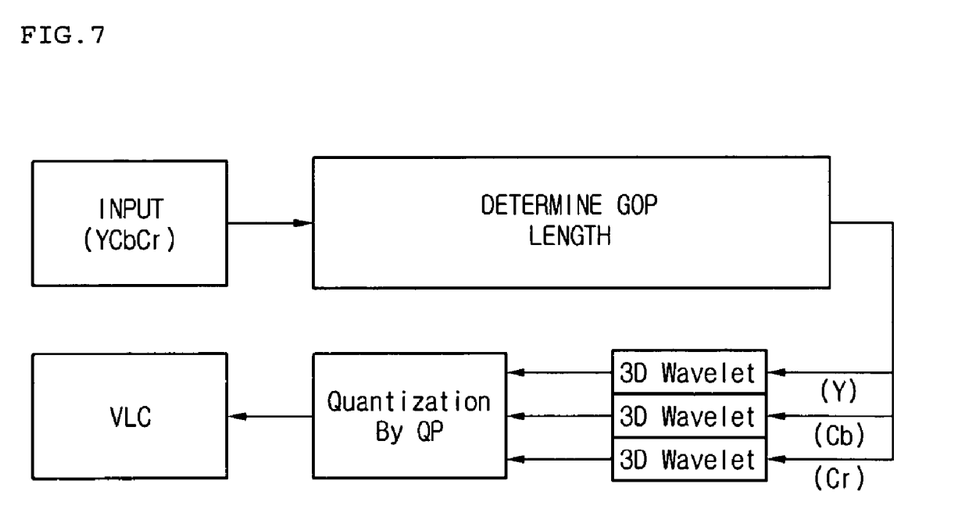
FIG. 7 is a diagram illustrating a method of coding a moving image on the basis of a 3D wavelet transformation according to an embodiment of the present invention.

FIG. 7 is a diagram illustrating a method of coding a moving image on the basis of a 3D wavelet transformation according to an embodiment of the present invention.

Referring to FIG. 7, the moving image coding method includes a process of determining the number of frames in a GOP on the basis of a difference between a current frame and a previous frame. The determining process will now be described with reference to FIG. 8.

Figure 8:
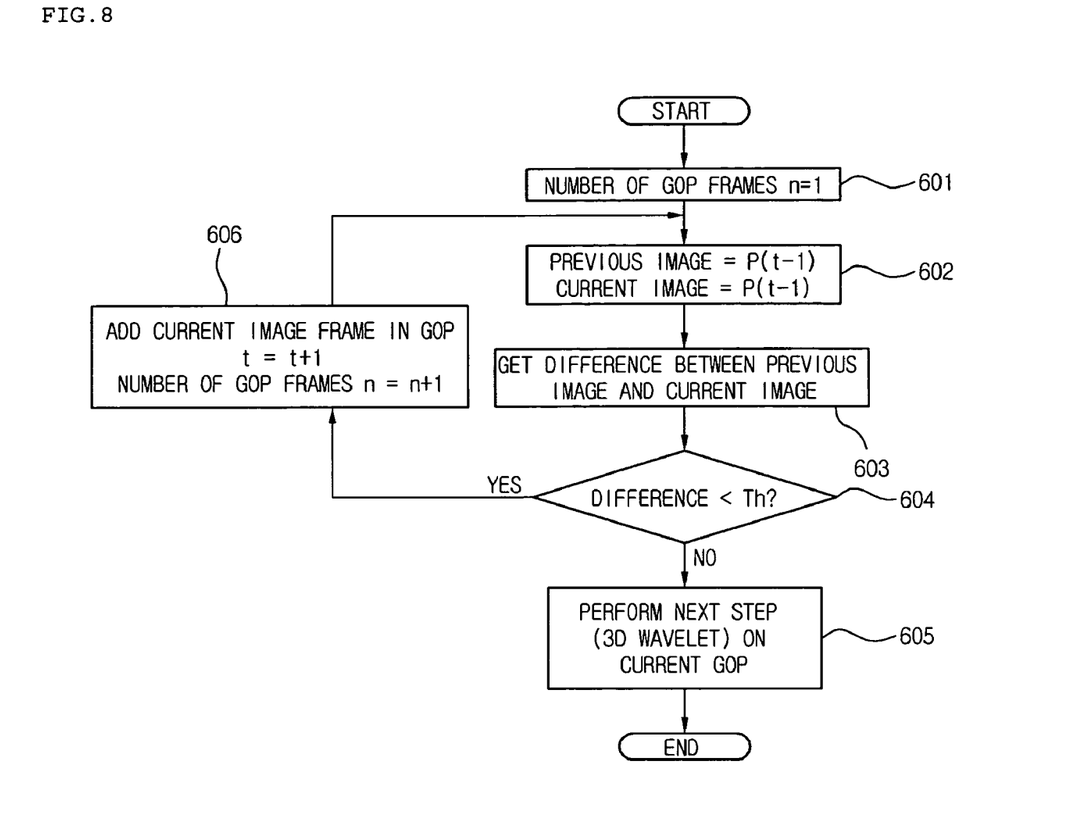
FIG. 8 is a flow chart illustrating an operation of determining the number of frames in a GOP in the moving image coding method according to an embodiment of the present invention.

FIG. 8 is a flow chart illustrating a process of determining the number of frames in a GOP (i.e., a TOP length) in the moving image coding method according to an embodiment of the present invention.

Referring to FIG. 8, a difference between a current image frame and a previous image frame is determined in operations 601, 602 and 603.

In an operation 604, it is determined whether the difference exceeds a predetermined threshold value.

If the difference exceeds the predetermined threshold value, the process proceeds to an operation 605. In the operation 605, image frames up to the current image frame is determined as one GOP, and then a subsequent 3D wavelet transformation is performed.

Unless the difference exceeds the predetermined threshold value, the process proceeds to an operation 606. In the operation 606, the number of frames to be included in a GOP is increased by 1, and then the process returns to the operation 602.

Meanwhile, the moving image coding method may further include a process of obtaining an accumulation value of the difference with respect to consecutive image frames to determine the number of GOP frames to be coded.

That is, even if the difference does not exceed the predetermined threshold value, if the accumulation value exceeds a given threshold value, all image frames up to the latest image frame not causing the given threshold value to be exceeded are included in a GOP prior to the subsequent 3D wavelet transformation. Here, the predetermined threshold value for the difference may be identical to or different from the given threshold value for the accumulation value.

The process of obtaining the accumulation value to determine the number of GOP frames can be efficiently used for a case where an overlap effect occurs during the scene change.

As described above, an image is processed for each of a Y component, a Cb component, and a Cr component. Even though the image is processed for each of the components during the GOP length determining process, the components Y, Cb and Cr must have the same GOP length. In the embodiment, the difference is compared with the predetermined threshold value on the basis of only a value of the Y component that is most sensitive to the coding rate, thereby determining the GOP length.

Figure 9:
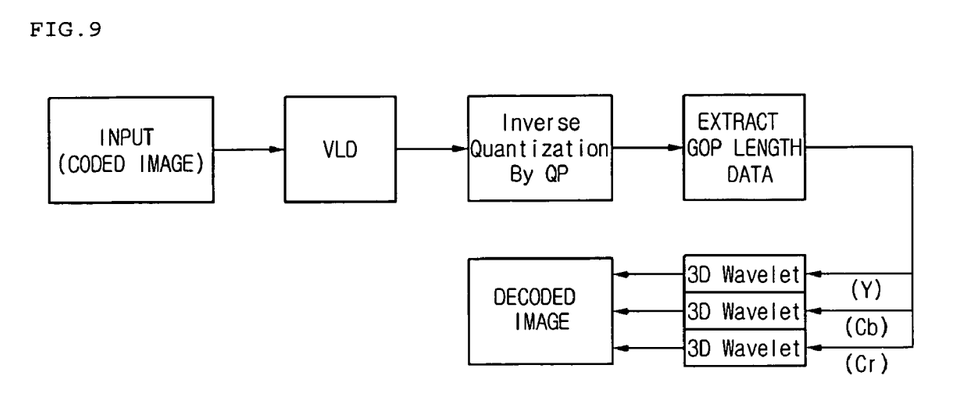
FIGS. 9 and 10 are diagrams illustrating a method of decoding a 3D wavelet transformed moving image according to an embodiment of the present invention.
Figure 10:
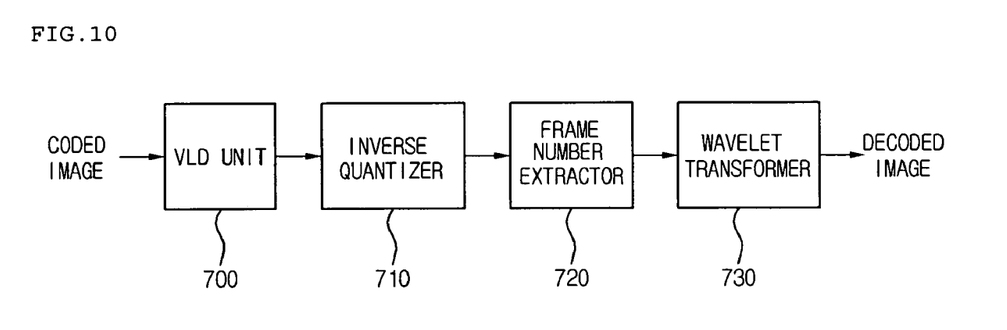

FIGS. 9 and 10 are diagrams illustrating a method of decoding a 3D wavelet transformed moving image according to an embodiment of the present invention.

Referring to FIGS. 9 and 10, a coded image is inputted and decoded. At this time, the decoding method may be performed using a VLD scheme. This VLD scheme is performed at a VLD unit 700 in FIG. 9.

An inverse quantizer 710 performs an inverse quantization operation on the decoding result from the VLD unit 700 by using a quantization parameter (QP). A frame number extractor 720 extracts data about the number of frames in a GOP.

Thereafter, a wavelet transformer 730 performs a 3D wavelet transformation on the inverse quantization results as many as the number of the GOP frames with reference to the extracted data about the number of the GOP frames, thereby restoring the original image (that is, decoding the coded original image into the original data).

As described above, the coding rate depending on the GOP length and the trade-off value depending on the amount of calculation for the decoding operation are optimized. Accordingly, it is possible to improve the coding rate and to reduce the time required for restoring one image frame.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of coding a moving image, the method performed in a coding apparatus and comprising:
   receiving an image;
   determining at least one group of picture (GOP) to be coded according to a number of image frames in the received image;
   performing a three dimensional (3D) wavelet transformation on the at least one GOP; and
   coding results of the 3D wavelet transformation,
   wherein determining the at least one GOP comprises:
      calculating a difference between a current image frame and a corresponding previous image frame to determine the number of image frames,
      comparing the difference to a predetermined threshold value,
      determining a first of the at least one GOP including image frames up to the current image frame when the difference exceeds the predetermined threshold value,
      obtaining an accumulation value of the difference with respect to a consecutive number of image frames,
      comparing the accumulation value to a given threshold value, and
      determining a second of the at least one GOP including image frames up to a latest image frame not causing the given threshold value to be exceeded when the difference does not exceed the predetermined threshold value.

2. The method according to claim 1, wherein the number of image frames is determined using the accumulation value of the difference.

3. The method according to claim 2, wherein the at least one GOP comprises the consecutive number of image frames up to the latest image frame not causing the given threshold value to be exceeded when the accumulation value exceeds the given threshold value and the difference does not exceed the predetermined threshold value.

4. The method according to claim 1, wherein the difference is calculated with respect to a Y component of the received image.

5. The method according to claim 1, wherein coding the results of the 3D wavelet transformation comprises:
- dividing the results of the 3D wavelet transformation by a quantization parameter; and
- compressing coefficients comprising resulting quotients by a variable length coding (VLC) scheme.

6. The method according to claim 1, wherein determining the number of image frames is performed according to each of the at least one GOP to be coded.

7. A method of decoding an image, the method performed in a decoding apparatus and comprising:
- receiving a coded image;
- performing a variable length decoding (VLD) operation on the coded image;
- performing an inverse quantization operation based on a result of the VLD operation using a quantization parameter;
- determining at least one group of picture (GOP) according to a number of image frames in the coded image; and
- performing a three dimensional (3D) wavelet transformation based on a result of the inverse quantization operation with reference to the determined number of image frames,
- wherein determining the at least one GOP comprises:
  - calculating a difference between a current image frame and a corresponding previous image frame to determine the number of image frames,
  - comparing the difference to a predetermined threshold value,
  - determining a first of the at least one GOP including image frames up to the current image frame when the difference exceeds the predetermined threshold value,
  - obtaining an accumulation value of the difference with respect to a consecutive number of image frames,
  - comparing the accumulation value to a given threshold value, and
  - determining a second of the at least one GOP including image frames up to a latest image frame not causing the given threshold value to be exceeded when the difference does not exceed the predetermined threshold value.

8. The method according to claim 7, wherein the number of image frames is determined using the accumulation value.

9. The method according to claim 7, wherein the difference is calculated using a Y component of the coded image.

10. The method according to claim 7, wherein determining the number of image frames is performed according to each of the at least one GOP to be decoded.

11. An apparatus for decoding an image, the apparatus comprising:
- a variable length decoding (VLD) unit for performing a VLD operation on an input image;
- an inverse quantizer for performing an inverse quantization operation on a result of the VLD operation;
- a frame number extractor for extracting data from the input image using a result of the inverse quantization operation to determine at least one group of picture (GOP) according to a number of image frames in the input image; and
- a wavelet transformer for performing a wavelet transformation on the result of the inverse quantization operation,
- wherein the frame number extractor calculates a difference between a current image frame and a corresponding previous image frame to determine the number of image frames, compares the difference to a predetermined threshold value, determines a first of the at least one GOP including image frames up to the current image frame when the difference exceeds the predetermined threshold value, obtains an accumulation value of the difference with respect to a consecutive number of image frames, compares the accumulation value to a given threshold value, and determines a second of the at least one GOP including image frames up to a latest image frame not causing the given threshold value to be exceeded when the difference does not exceed the predetermined threshold value.

12. The apparatus according to claim 11, wherein the number of image frames is determined using the accumulation value.

13. The apparatus according to claim 11, wherein the difference is calculated using a Y component of the input image.

14. The apparatus according to claim 11, wherein determining the number of image frames is performed according to each of the at least one GOP to be decoded.

15. The method according to claim 1, wherein the given threshold value is different from the predetermined threshold value.

16. The method according to claim 7, wherein the given threshold value is different from the predetermined threshold value.

17. The method according to claim 11, wherein the given threshold value is different from the predetermined threshold value.

* * * * *